(12) United States Patent
Lamy-Bergot et al.

(10) Patent No.: US 9,474,091 B2
(45) Date of Patent: Oct. 18, 2016

(54) METHOD AND SYSTEM FOR THE ESTABLISHMENT AND SUSTAINING OF A BROAD-BAND LINK

(71) Applicant: THALES, Neuilly-sur-Seine (FR)

(72) Inventors: Catherine Lamy-Bergot, Gennevilliers (FR); Jean-Baptiste Chantelouve, Gennevilliers (FR)

(73) Assignee: Thales, Courbevoie (FR)

( * ) Notice: Subject to any disclaimer, the term of this patent is extended or adjusted under 35 U.S.C. 154(b) by 95 days.

(21) Appl. No.: 14/106,365

(22) Filed: Dec. 13, 2013

(65) Prior Publication Data

US 2014/0169199 A1 Jun. 19, 2014

(30) Foreign Application Priority Data

Dec. 14, 2012 (FR) .................................. 12 03407

(51) Int. Cl.
| | |
|---|---|
| *H04W 76/02* | (2009.01) |
| *H04W 24/00* | (2009.01) |
| *H04W 24/08* | (2009.01) |

(Continued)

(52) U.S. Cl.
CPC ............. *H04W 76/02* (2013.01); *H04W 24/08* (2013.01); *H04W 28/24* (2013.01); *H04W 72/085* (2013.01); *H04W 76/023* (2013.01); *H04W 84/18* (2013.01)

(58) Field of Classification Search
CPC ............................ H04W 76/02; H04W 24/00
See application file for complete search history.

(56) References Cited

U.S. PATENT DOCUMENTS

2002/0003834 A1* 1/2002 Yoshimura ............. H04B 1/707
375/147
2003/0165183 A1* 9/2003 Ketchum ............ H04J 13/0048
375/146

(Continued)

FOREIGN PATENT DOCUMENTS

CN 101626584 A1 1/2010
EP 1507371 A2 2/2005

(Continued)

OTHER PUBLICATIONS

MIL-STD-188-141A—"Interoperability and Performance Standards for Medium and High Frequency Radio Equipment"; Department of Defense Interface Standard, Sep. 15, 1988, pp. 1-185, XP055082323.

(Continued)

*Primary Examiner* — Brandon Renner
(74) *Attorney, Agent, or Firm* — Baker & Hostetler LLP

(57) ABSTRACT

A system for establishing and sustaining a broadband communication is provided wherein: the first master post is suitable for transmitting a known test sequence on a sub-band Bk to the second called post as soon as the said second called post acknowledges the receipt of a communication setup message on a frequency fi; the said second controller being suitable for determining quality scores on the Mk frequencies of the sub-band Bk and for transmitting the said values of quality to the first master post. The first master post is suitable for determining and for evaluating the capability of the sub-band Bk to respond to the SLA target service a sub-channel on the basis of the scores of qualities received, and for selecting the sub-band Bk which exhibits the required capability and thereafter for triggering the communication with the said second post. Application to HF broadband systems.

18 Claims, 5 Drawing Sheets

(51) Int. Cl.
*H04W 28/24* (2009.01)
*H04W 72/08* (2009.01)
*H04W 84/18* (2009.01)

(56) References Cited

U.S. PATENT DOCUMENTS

| | | | | |
|---|---|---|---|---|
| 2005/0249139 | A1* | 11/2005 | Nesbit | 370/312 |
| 2011/0122980 | A1* | 5/2011 | Bradshaw | 375/356 |
| 2012/0040618 | A1* | 2/2012 | Furman et al. | 455/62 |
| 2012/0131548 | A1 | 5/2012 | Leconte et al. | |

FOREIGN PATENT DOCUMENTS

| | | |
|---|---|---|
| EP | 2418892 A1 | 2/2012 |
| FR | 2967799 A1 | 5/2012 |
| FR | 2981189 A1 | 4/2013 |
| FR | 2981232 A1 | 4/2013 |
| WO | 2005/060142 A1 | 6/2005 |
| WO | 2009/101592 A2 | 8/2009 |
| WO | 2013/053703 A1 | 4/2013 |
| WO | 2013/053705 A1 | 4/2013 |

OTHER PUBLICATIONS

MIL-STD-188-110C, "Interoperability and Performance Standards for Data Modems", Department of Defense Interface Standard, Jan. 2012, 247 pages.

* cited by examiner

METHOD AND SYSTEM FOR THE ESTABLISHMENT AND SUSTAINING OF A BROAD-BAND LINK

CROSS-REFERENCE TO RELATED APPLICATION

This application claims priority to foreign French patent application No. FR 1203407, filed on Dec. 14, 2012, the disclosure of which is incorporated by reference in its entirety.

FIELD OF THE INVENTION

The invention relates to a method and a system allowing link setup and link sustaining in a broadband communications system, notably for high frequencies or HF. It applies within the framework of the need for ALE link setup (the initials standing for Automatic Link Establishment) and proposes a new-generation approach, termed 4G, making it possible to initialize a so-called "HL XL" traffic link relying on the use of n*3 kHz not necessarily contiguous of useful band, and to initialize a so-called contiguous-bands traffic link, either narrowband at 3 kHz, or of broadband type, from 6 to 24 kHz as in MIL STD 188-110C, known to the Sector, for various uses.

It applies in point-to-point communication systems.

BACKGROUND

A wireless communication system generally comprises several radio devices or posts exchanging data of any type. In the communications sector, HF linkups offer notably a beyond line of sight or BLOS capability which makes it possible to achieve communications at long, or indeed very long distance, without requiring recourse to a satellite or to the use of relay stations. Nonetheless, the quality of the communications varies as a function of atmospheric conditions, the ionospheric medium being extremely variable. In the VHF or UHF band the propagation channel fluctuates less but mobile deployments can lead to cases of jamming on account of a desire for spatial reuse of the frequencies, thus also giving rise to fluctuations in the quality of the channel, depending on the frequencies used.

One of the subjects of the invention relates to link setup between two radio posts. Of more particular concern hereinafter is the case of HF posts, wherein at least one calling post has a broadband operating capability (transmission and/or reception) and wishes to determine a communication band usable for a bandwidth of greater than 3 kHz. This value corresponds to what is offered by the current standards, whether involving the linkup establishment solution automatically, termed second-generation and known by the abbreviation 2G ALE (2G automatic link establishement) according to the MIL STD 188-141A standard, with or without proprietary variants, or termed third-generation or 3G ALE according to the STANAG 4538 standard, with or without proprietary variants. This type of link setup is particularly of interest in respect of posts capable of employing an aggregate of several HF channels such as, for example, proposed in annex D of the MIL STD 188-110C standard, wherein is described the use of several contiguous carriers of 3 kHz or of the generalized use such as described in the patent applications FR 10.04560 and FR 11.03083 of the Applicant or of standards which use a single-carrier waveform, according for example to annex D of the MIL STD 110-188C standard.

The state of the art known to the Applicant proposes various techniques for HF broadband link setup and link sustaining.

A first technique consists in performing a 3 kHz conventional link setup and in arbitrarily widening the use around, optionally with a shift (offset), the central frequency with respect to the initial frequency, even if this results in decreasing the band used or in relaunching the procedure if the band is used. This technique exhibits the risk of jamming of already used frequencies. There is indeed no assurance that there are bands available around this frequency selected by the ALE, and the duration of convergence is unknown.

A second technique relies on a 3 kHz conventional link setup and listening to the band around, so as to determine whether sufficient available band for transmitting in broadband is found. There is however no assurance that there are available bands around this frequency selected by the ALE, and the duration of convergence is once again unknown, this possibly leading to a potentially lengthy solution.

A third solution consists in carrying out as many 3 kHz link setup procedures as bands considered and deciding as a function of the measurements made on the possible communication linkups. This solution leads to a necessarily slow mechanism, whose convergence may even be problematic if initially free frequencies are occupied meanwhile in the course of the procedure.

A fourth solution described in patent application EP 2 418 892 entitled "High frequency automatic link establishment communication system with wideband probe and related method", carries out an innately broadband link setup from 6 to 24 kHz on the basis of a robust single-carrier frequency $F_0$ to evaluate the occupancy of a 6 to 24 kHz channel and to retain the widest possible free span in this channel. This technique applies only in respect of contiguous bands.

Despite all the advantages offered by the various techniques known from the prior art, the existing solutions based on 3 kHz link setup do not make it possible to evaluate the quality of the adjacent channels dynamically, unless a very large link setup time is accepted. The solution based on a 24 kHz carrier such as described in patent application EP 2 418 892 does not make it possible to evaluate a plurality of channels distributed over more than 24 kHz, or to readily adapt the waveform in the case where the initial frequency is surrounded by disturbed channels.

DEFINITIONS

The term "legacy" designates a historic system or standard relying on single-band transmissions, for example.

The calling post corresponds to the communication post or device which starts the communication request. The called post is that which receives this request. The word post and the word station are used interchangeably to designate one and the same object in the present description.

SUMMARY OF THE INVENTION

The subject of the present invention relates notably to a method making it possible to establish a link in broadband mode, preferably in a manner compatible with a legacy link setup or "historical link", in the sense that a broadband incompatible post will be able to respond to the link setup. This scheme also makes it possible to carry out an estimation of the frequencies usable for single-carrier communications such as those proposed in the MIL STD 188 110C standard, doing so more rapidly than the current solutions permit.

The invention relates to a system for establishing and sustaining a link ALE within the framework of a broadband communication, the said system comprising at least one first master communication post suitable for transmitting a message for the establishment of a communication with a desired SLA target service, the first post comprising a first radio transmitter/receiver and a first controller, a second called communication post comprising a second radio transmitter/receiver and a second controller, the system is characterized in that:

the first master post is suitable for transmitting a known test sequence, $S_{test}$, on a sub-band Bk to the second called post as soon as the said second called post acknowledges the fact of switching to probing mode to determine the best configuration to be adopted for the establishment of the link, the said second controller is suitable for determining quality scores on the Mk frequencies of the sub-band Bk and for transmitting the said values of quality to the first master post, the said first master post is suitable for determining the capability of the sub-band Bk to respond to the SLA target service, a sub-channel on the basis of the scores of qualities received, and for selecting the sub-band Bk representing the required capability, and thereafter for triggering the communication with the said second called post.

According to one embodiment, the communication is bidirectional and the second post is suitable for transmitting a second known sequence to the first master post, the said master post being suitable for evaluating the capability of a sub-band Bk to respond to the needs of the SLAtarget services, SLAtarget2 in the communication direction from the master post to the called post and vice versa.

The said first master communication post comprises, for example, means suitable for determining a set of frequencies termed call frequencies $f_A$ for the establishment of a narrowband link between the first master post and the second post as a function of constraints in terms of requested bitrate, permitted maximum latency, operating point of the target error rate, the said frequencies being used during the communication request.

The first master post can comprise means suitable for establishing a narrowband communication linkup between the first master post and the second called post, for verifying the compatibility of the called post with the 4G mode of communication and for continuing the communication in a mode compatible with the called post.

The known test sequence $S_{test}$ is, for example, composed of a frame comprising a header conveying the address of the called post, a first series of medium-bitrate symbols and a second series of low-bitrate symbols.

The invention applies in respect of a broadband communication system, for example in respect of HF high-frequency communications.

The invention also relates to a method of broadband ALE link setup and link sustaining between a first master post and a second called post, characterized in that it comprises at least the following steps:

the called post is on standby monitoring a predefined frequency plan $\{f_1, \ldots f_M\}$, the master post transmits a communication request message to the called post on a frequency fi and waits for its acknowledgement of call detection, the master post has a set of possible sub-bands for the communication, the master post starts the channels quality calculation procedure by transmitting a known test sequence to the said called post, the said called post determines the quality scores on the Mk frequencies of the sub-band Bk, and then transmits these values to the master post, the master post determines on the basis of these quality scores, the capability of the sub-band Bk to respond to the awaited SLA service, and selects the said sub-band if the latter makes it possible to respond to the SLA service requested by the communication, or repeats the sub-band search steps by selecting a new sub-band Bk, or else in the case where there no longer remain any sub-bands making it possible to attain a quality higher than the best quality found on the previously tested sub-bands, elects the sub-band exhibiting the best quality score, the master post determines the sub-band to be used for the communication, confirms to the called post the selected sub-band as well as the sub-channels adopted and starts the communication.

The method comprises, for example, a step of determining the possible sub-bands in which, once the called post has validated the call detection, on the frequency fi, the said called post transmits its information regarding frequency plan qualities and its post characteristics, and the said master post determines the possible sub-bands.

The method implements, for example, a bidirectional communication and the method executes, for example, at least the following steps: during the transmission of the quality scores obtained by the second called post for a sub-band Bk, the second called post transmits a second known sequence to the master post, the said master post then evaluates the capability of a sub-band Bk to respond to the needs of the SLAtarget services, SLAtarget2 in the communication direction from the master post to the called post and vice versa.

During the implementation of the method, the quality score of a channel can be evaluated by a post receiving a test sequence by estimating the bitrate that the post will be able to receive on the channel considered.

In the case where no sub-bands satisfying the quality required for the communication are found, the method selects the band exhibiting the best quality score and updates the scores of the various channels by the most recent tested value.

The method can comprise a step of narrowband link initialization verifying the compatibility of the mode of communication between the master post and the called post and continues the communication with the compatible mode found or terminates the communication request.

According to a variant embodiment, the method comprises a step of link initialization using a broadband called post suitable for monitoring several frequencies at the same time.

The method uses, for example, as test sequence a message in the form of a frame composed of a first header containing the address of the called post, followed by a first series of medium-bitrate symbols and a second series of low-bitrate symbols.

The symbols used are, for example, chosen from among the following list: PSK (Phase Shift Keying), QAM (Quadrature Amplitude Modulation).

The communication between the master post and the called post being established, then the information transmitted is transmitted multiplexed on all the pathways.

The method is used in the case of an HF broadband communication band.

BRIEF DESCRIPTION OF THE DRAWINGS

Other characteristics and advantages of the device according to the invention will become more apparent on reading the description which follows of an exemplary embodiment given by way of wholly non-limiting illustration, together with the figures which represent.

DETAILED DESCRIPTION

The present invention will now be described by referring to FIGS. 1 to 7, for an HF broadband communication system, in an illustrative and wholly non-limiting manner.

Figure 1:
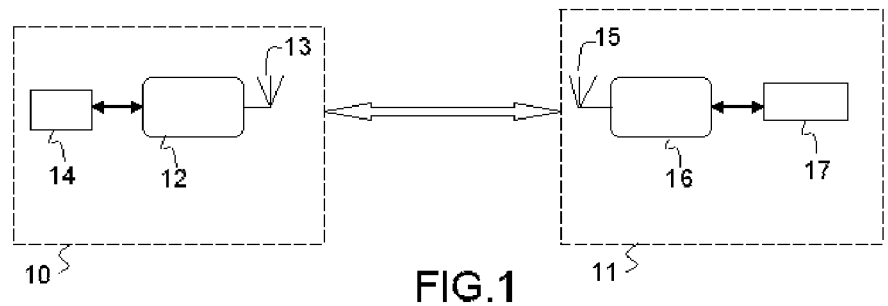
FIG. 1, a diagram of an HF communication system.

FIG. 1 shows diagrammatically an exemplary HF broadband communication system suitable for implementing the ALE link establishment procedure according to the invention. The system 1 comprises a first HF radio communication post or first device, 10, and a second HF communication post or second device, 11. The first communication device 10 comprises a first transmitter/receiver 12 coupled to a first antenna 13 and a first controller 14. The first transmitter/receiver is endowed with a microprocessor and with a modem. The second HF radio communication device 11 comprises a second antenna 15, a second transmitter/receiver 16 coupled to the second antenna and a second controller 17 coupled to the second transmitter/receiver. The second transmitter/receiver is itself equipped with a microprocessor suitable for executing the steps of the method according to the invention. According to another variant embodiment, the transmitter/receiver 12 or 16 can in practice be linked to different transmission and reception antennas. In the example given, the posts are HF radio posts.

The first and second communication devices 10, 11 can operate in a range of frequencies varying from 1.5 to 30 MHz (so-called military HF band). This device can also be used in VHF/UHF (Very High Frequency/Ultra High Frequency) higher bands for radios having a broadband capability.

Before explaining the implementation of the method according to the invention, a few assumptions and principles are laid down.

The frequencies selected are, preferably, used as far as possible in both directions of communication, including when the bitrates to be transmitted are dissymmetric, so as to prevent the frequencies from being detected as usable by other posts, and therefore prevent the communication from deteriorating.

In the given example of implementation of the method according to the invention, it is assumed that it is the calling post or station 10 on the initiative of the opening of the communication which manages the establishment of the communication and its sustaining and which is the master post. It is therefore this post which collects the information necessary for choosing the frequency or frequencies, without it needing to provide its own information, such as, for example, its antenna capabilities, its power, its observation of the band occupancies and its noise levels.

The information of the called post will be taken into account by virtue of the transmission of the data regarding quality and position, but also possible needs of the post so that it can profit from the linkup to transmit data which could be on standby awaiting transmission of its share, thus causing the link to switch to a mode termed "bi-directional", as opposed to the case where the receiver post does not have any data to be transmitted, apart from the signalling and control data (i.e. acknowledgements) that is referred to as "uni-directional" mode.

In a strategy for rationalizing the use of the spectral resource, the method will be able to split the channels of the frequency plan into two types: frequencies termed "call frequencies", intended notably to be used solely for the start of link setup and frequencies termed "communication frequencies", used notably in the step of data exchange, these frequencies being able to be evaluated during the implementation of the method. This separation offers the advantage of limiting the number of call frequencies and therefore of accelerating the first step of link setup, the crowding on these frequencies having to be limited by their use solely for link setup.

In practice, it is possible to choose, when planning the communication system, to allocate the role of call frequency to the frequencies that are off-centred with respect to the others. Conversely, the fact of favouring frequencies which are not capable of high bitrate, the frequencies having few neighbours at less than 200 kHz, will make it possible to avoid reducing the high-bitrate capabilities.

Figure 2:
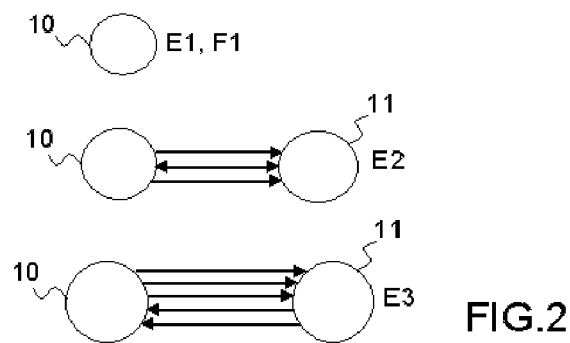
FIG. 2, a chart of the steps implemented in the method according to the invention, FIG. 3, an illustration of the first phase with selection of the frequencies to be tested and of the candidate frequency bands, FIG. 4, the illustration of the definition of useful sub-bands on the passband, FIG. 5, an example of steps of incorporation of the ALE procedure, FIG. 6, a block diagram of the steps implemented for choosing the traffic sub-band, FIG. 7, an exemplary format of a test frame, FIG. 8, a block diagram in the case of a bilateral communication, and FIG. 9, a possible illustration for ALE/ALM method nesting.

In FIG. 2 are represented in summary, three of the steps that can be implemented by the method according to the invention.

Step 1

Step 1, E1, is optional and corresponds at the level of the calling post 10 to a step of selecting the call frequencies as a function notably of the time, of the site, of the pre-existing probing information, of the local measurements, if any, and of the knowledge of the frequency plan, of a suite of frequencies extracted from the overall frequency plan so as to establish a 3 kHz narrowband link, between calling and called parties. These frequencies will form part of a set of frequencies termed call frequencies, which as stated previously, will be able to be limited in number so as to accelerate the initial link setup.

Figure 3:
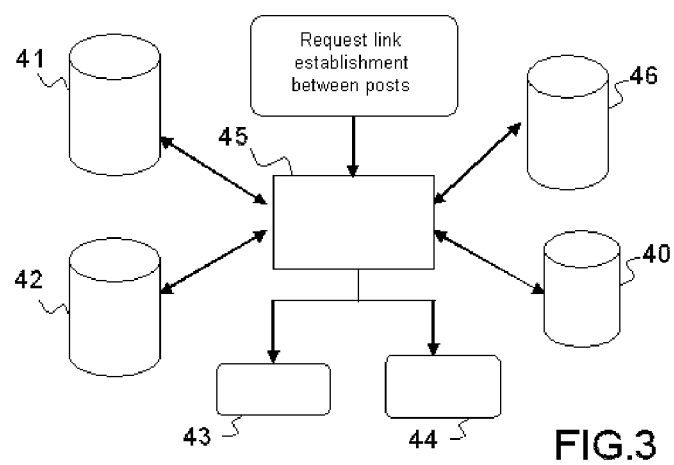

FIG. 3 shows diagrammatically phase 1 or step 1 of the procedure which will lead to defining a set 43 of call frequencies $f_A$, as well as sub-bands Bi, which are possible candidates, 44, for the communication according to the desired service, from among those of the whole set of the frequency plan $\{f_1, \ldots, f_M\}$. The method will determine, locally at the master post or call station 10, the frequencies making it possible to launch the establishment of the link with the called post and to determine as rapidly as possible a sub-band Bk making it possible to implement the desired service, defined by its SLA, the abbreviation standing for Service Level Agreement, which gives constraints in terms of requested bitrate, of permitted maximum latency, of operating point in terms of signal-to-noise ratio.

The call post 10 dispatches a request for establishing a linkup between it and a called post 11. The function 45 for collecting the information and evaluating the link setup choices interfaces with the onboard prediction software 40 which takes into account information relating to the geographical positions stored in a database 41, to the known qualities stored in a database 42, so as to define 43, a call frequency plan as well as the set 44 of possible communication sub-bands, included in an interval $F_{min}$, $F_{max}$ on the basis of the possible frequencies 46.

According to one mode of implementation, the method assumes the availability of a series of elementary channels, typically of 3 kHz, forming part of an overall frequency plan fed into the call post when preparing for its use. This frequency plan can contain any type of frequencies, for example frequencies which are not or only slightly passing at certain moments of the day, of the year, etc.

For example, within the framework of communications in a tactical operations theatre or else in the aero-naval sector, coherence over a zone defined by a radius of several hundred kilometers of the LUF/MUF (Lowest Usable Frequency/Maximal Usable Frequency) values may make it possible to restrict the monitoring span for the posts that are listening and thus allow the calling posts to launch their link setup on fewer frequencies, by eliminating those which are not passing.

Within the framework of a planned operation transferring information to a command centre, the knowledge of the deployment zone as well as the assembly zone, combined with the date, may make it possible to select automatically on each post an effective frequency sub-plan which will be the one used automatically by all the posts.

When the ALE procedure is asynchronous, 2G-type procedure for example, the calling post will then be able to make its choice of order of calling of the frequencies as a function of its own radio environment, and of its prior knowledge of the linkups with the called post.

Figure 4:
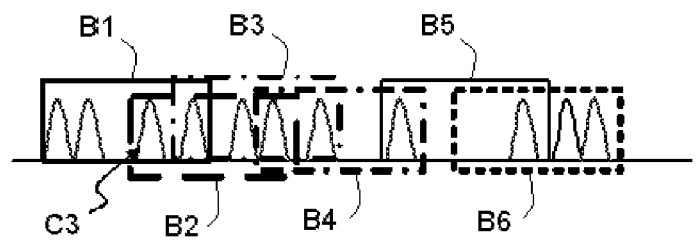

In the course of this first step, the method carries out a step of filtering as a function of the limitations of the communication, so as to define a set of possible radio sub-bands on which the high-bitrate system is apt to work. These sub-bands Bj are, for example, a grouping of the elementary channels that are given when defining the frequency plan. These various sub-bands can be predefined upstream of the operation of the communication system. FIG. 4 gives an example of mutually disjoint sub-bands Bi which may have common channels $C_k$, for example the channel $C_3$ is common to the two sub-bands $B_1$, $B_2$.

The initial call of the calling post implicitly provides a synchronization between the two sides of the communication linkup, the said synchronization being related to the recognition of the preamble of the call or communication request message. This synchronization offers the possibility of having a clock mechanism making it possible to switch in a coordinated manner from a non-operational sub-band $B_i$ to the next sub-band $B_{i+1}$ on expiry of a time interval or "timer" in the steps described hereinafter.

Step $E_1$ is optional, it is indeed possible to possess beforehand a frequency plan and predefined sub-channels making it possible to implement the service desired by its SLA and execute the subsequent steps of the method. In a synchronous network with legacy posts, the method will consider an existing frequency plan, or an update of this plan, distributed by a master post.

Step 2

This step makes it possible notably to build heterogeneous networks in which the posts do not use the same communication protocols, for example the 2G, 3G or 4G standards.

Step 2, E2, corresponds to the phase of establishing a narrowband link, for example 3 kHz, between calling post 10 and called post 11 compatible with "legacy" standards, for example the 2G or 3G standards, so as to establish a communications linkup between the calling post 10 and the called post 11, before launching the procedure aimed at linkup creation and verifying the 4G capability of the posts.

Figure 5:
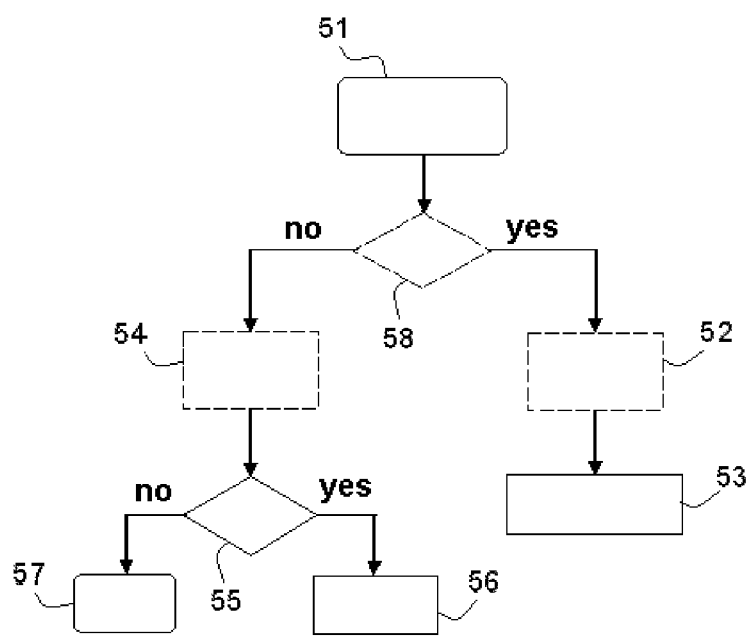

In order to boost the rapidity with which a 4G ALE procedure according to the invention is put in place, it is possible to verify that the step is compatible with former generation posts of 2G or 3G type. This is done, for example, if the HELLO message is comprehensible to a legacy post just as for a 4G post, the latter alone responding with its capabilities and therefore making it possible to continue the procedure for 4G as is illustrated in FIG. 5.

The calling post dispatches a Hello message, 51, on a 3 kHz channel, to the called post. If the called post is compatible with the "HF XL" mode then the called post responds by communicating its information regarding capabilities (the type of radio station or post, the bandwidth capability, its power, the characteristics of its antenna, and an estimation of quality over the whole of the frequency plan, possible need for transmission on its side and associated SLA, etc.), 52, and then the method passes to the third step of the method for broadband, 53. If at least one of the posts is not compatible with the 4G mode, then the called post responds, 54, in its standard 2G or 3G mode. It is then up to the calling post to decide whether it agrees to continue communicating, 55. If it does (yes), 56, the method executes a standard procedure corresponding, in the given example, either to 2G or 3G, otherwise, 57, the calling post abandons the connection attempt. This approach is described in FIG. 5.

In practice, 4G ALE will be able to emulate only one of the two modes by choice at one and the same instant, unless it carries out multiple monitoring, as is already the case currently. For the implementation of these steps, it is possible to use messages in the 2G ALE or 3G ALE format, depending on the type of compatibility adopted, with the use of one or more non-useful bit(s) of the message to signal 4G capability, and to which the called post will be able to respond as a function of its own 4G capability.

This phase is carried out without presupposing that the called post has a capability other than 3 kHz narrowband. This functionality makes it possible notably not to foretell the type of deployment, it being possible for example for a broadband post to be employed with a narrowband antenna a first time, and then a broadband antenna another time. Whether the mode of communication be synchronous or asynchronous, the called post will scan the whole of the call frequency plan, the latter consisting solely of passing frequencies selected during step 1. In practice, if the called post is broadband, it will be able to monitor several frequencies at the same time and thus improve its chances of reception and/or accelerate link setup. In the particular case of a called station capable of listening instantaneously to the whole set of possible call frequencies, it will no longer be useful to be synchronous in order to undertake link setup, the calling station then being able to choose to scan the call frequencies at its leisure. In the particular case of a called station capable of listening to part of the call frequencies, it will be possible to propose to scan the frequencies so as to favour fast link setup, for example by grouping together the frequencies that are close to one another. However, this phase remains compatible with a standard link setup such as carried out in the 2G or 3G narrowband procedures.

In this phase of establishing a linkup on frequency fi, it is not necessary for the frequency fi to necessarily be in the final target sub-band of high-bitrate communications.

Preferably, the method takes into account the qualities at the level of the call station of the communication, so as to avoid possible disturbances on the signal received.

The caller or calling post manages the set of steps of the method according to the invention, however, the call post will provide the SLA information which allows the receiver of the called post to know which type of resource to switch to (i.e. high-bitrate or low-bitrate capability). Thus in the case where the SLA corresponds, for example, to a simple low-bitrate phone communication, the link setup phase alone could be of 4G type, the subsequent data transmission phase being able to take place with the transmitter/receiver using a "legacy" mode. Such an approach makes it possible to profit from the acceleration of the link setup, but without occupying a rare resource of XL type for low-bitrate services.

Step 3

Step 3, E3, is a phase in which the method will grade the channels so as to choose the communication sub-band. This is a phase of broadband evaluation of the various bands conceivable for the communication and of selecting the working sub-band as a function of a measurement of quality of the various channels, with selection of the first tested band compatible with the need expressed in terms of service, or by default if the service is very demanding, of the best possible sub-band. This third step and the final choice of frequencies, or grading of the channels, is in the present example managed by the calling post, dubbed the master post.

During the broadband evaluation step, the method according to the invention will seek to:

1—incorporate the information of local probing of each post or station right from the commencement of the link setup process, notably when the post has been able to establish first measurements of quality, relying, for example, on a measurement of noise level in the channels of interest (those of the frequency plan or of the subset selected). The object of this information will be to allow the calling post to launch the frequency search phase towards a favourable a priori sub-band;

2—refine the evaluation of the quality of each of the possible channels according to the communications plan. Indeed, if within the framework of the monitoring phase it is possible for the various posts to constitute an information table regarding quality relying on a simple item of information regarding noise level, such a measurement remains rather imprecise and will not be available for a post wishing to carry out a late input or previously in communication, therefore not in a position to evaluate the channel regularly;

3—take into account, when choosing the sub-band and the recommended number of frequencies, the SLA aimed at, in terms of bitrate, latency, operating point, doing so optionally both at the level of the calling post and of the called post or receiver.

The method will test in the various predefined sub-bands, the use of a known sequence, for example a pseudo-random sequence, lasting a duration of a few seconds to a few tens of seconds, so as to allow a mean measurement of the quality found on a sub-band with a constant power in each channel. In fact, the quality measured on a channel does not depend on the number of channels in the sub-band.

The posts will transmit their response on the whole set of channels by multiplexing the data so as to use the frequency diversity afforded notably in the case where responses or information regarding change are transmitted, it being possible to envisage an overcoding to ensure that the information is transmitted properly, whereas the known sequences are transmitted un-multiplexed so that the performance of each channel can be evaluated independently.

The method according to the invention relies notably on a calculation of the qualities on the Mk frequencies of a sub-band Bk, doing so on a defined set of sub-bands by incorporating, if they exist, the teachings of step 1, the capabilities of the called post which will have been communicated in step 2 as well as the constraints of the service or services sought in terms of SLA. The steps implemented in the case of a unidirectional communication are, for example, described hereinafter and in conjunction with FIG. 6. The calculation of the channel quality is carried out on each channel and is done on the equalization error and therefore channel by channel.

Initially, the master post will define a set of possible sub-bands for the communication.

This action is done in the master post on the basis of the information available regarding its own capabilities and those of the called post, obtained during step 2, as well as of the teachings of step 1. Having determined, 64, one or more possible sub-bands and their associated channels, the master post can pass them one after the other or preferably order them in terms of possible bitrate at the latency operating point+target error rates. Let Bi be the various ordered sub-bands, with i varying from 1 to p and their M associated channels $f^1_i, \ldots f^1_M$.

The master post then triggers, 65, the procedure making it possible to determine the most suitable sub-band for communication between the two posts.

The master post will then request on the narrowband frequency fj established during step 2 the starting of the procedure for calculating quality for the target SLA for the sub-band $B_1$ and its M channels $f_1^1 \ldots f_M^1$. The called post acknowledges receipt of confirmation of the communication on the frequency fj, 66. It passes to listening mode, for example on a frequency of 200 kHz on sub-band $B_1$. The called post returns a message of agreement to the master post to begin the procedure for selecting the traffic sub-band.

The master post transmits, 67, a sequence of known symbols on sub-band $B_1$ to the called post. The called post, listening on this sub-band $B_1$, will demodulate the $M_1$ frequencies of sub-band $B_1$. Next, the called post will, 68, compare the symbols received with the known sequence and will estimate the qualities on the $M_1$ frequencies of the sub-band and allocate quality scores Qi for the $M_1$ frequencies. The called post, 69, dispatches the corresponding quality scores to the master post. The transmission of this response information is performed, for example, in low-bitrate mode interleaved on the $M_1$ frequencies or on part of these frequencies, the best ones measured in the sense of the called post.

The master post, on receipt of the quality scores will evaluate, 70, the capability of sub-band $B_1$ to respond to the target SLA service. The master post therefore receives a set of scores in respect of the channels of its sub-band and derives therefrom an overall score for the sub-band.

If the sub-band $B_1$ fulfils the conditions required in respect of the service then the master post advises, 67, the called post, by using the sub-band B1 and the communication between the two posts can begin.

In the converse case, 72, when sub-band $B_1$ does not offer the capability required in respect of the communication, the master post announces to the calling post that it is considering the next band $B_{i+1}$ and for the associated channels. The calling post acknowledges receipt and listens in on the new sub-band. It acknowledges receipt to the master post and performs measurements of quality for this sub-band.

In the case of non-response on a sub-band the method switches automatically after expiry of a timer, both transmitter side and receiver side, to a sub-band $B_{i+1}$ of the frequency plan.

By generalizing the steps of the calculation for a sub-band Bk, the method can be explained as follows. The master post transmits a known sequence of symbols on the sub-band Bk. The called post listens in on this sub-band and demodulates the Mk frequencies of the sub-band. The called post compares the known sequence with the demodulated symbols and estimates quality scores on each of the frequencies Mk. The called post transmits this information in interleaved low-bitrate mode on the Mk frequencies for example, to the master post. The master post evaluates the capability of the sub-band Bk to respond to the SLA service. In the case where the sub-band Bk satisfies this capability, the master post confirms to the called post, the use of the sub-band Bk and of its associated channels. The HF broadband link setup procedure is terminated and the communication will be performed on the n chosen channels of the sub-band Bk, 69. The called post will receive the message from the master post and pass to reception mode on the n chosen channels of Bk. The called post transmits to the master post a message OK for communication. The two posts are then positioned on the selected sub-band and start the communication. The second controller is suitable for determining quality scores on the Mk frequencies of the sub-band Bk and for transmitting the values of quality to the first master post.

Each of the sub-bands will be tested until one of the following two conditions is attained:
  the quality necessary for the requested SLA service is attained, the sub-band considered is adopted,
  it is no longer possible with the remaining sub-bands to attain a quality higher than the best quality found on the previously tested sub-bands, for example through want of frequencies.

The quality of the link is calculated as the sum of the qualities of the various channels that it contains. These elementary qualities are themselves calculated as a function of the bitrate that it will be possible to pass on the channel. In practice, the sequence of known symbols or test sequence $S_{test}$, grouping together PSK (Phase Shift Keying) and QAM (Quadrature Amplitude Modulation) modulation symbols will make it possible to estimate whether it is possible to pass for example the following bitrates: 12800 b/s, 9600 b/s, 8000 b/s, 6400 b/s, 4800 b/s, 3200 b/s, 1200 b/s, 600 b/s, 300 b/s, 150 b/s, 75 b/s or 0 b/s (case of non-reception). For the sake of generalization, it will be possible to add the value 1600 b/s, corresponding typically to a BPSK mode, low-bitrate extension of ST4539.

The post receiving the test sequence $S_{test}$ evaluates the perceived quality and determines a "score" for each channel by estimating the bitrate that it will be able to receive on the channel considered. This score, on a scale from 0 to 15 (4 bits) for example: 0=no reception, 1=75 b/s, 2=150 b/s, 3=300 b/s, 4=600 b/s, 5=1200 b/s, 6=1600 b/s, 7=3200 b/s, 8=4800 b/s, 9=6400 b/s, 10=8000, 11=9600, 12=12800, the following scores remaining reserved for combinations of modulations and coding or modcod not yet standardized.

In both directions, once the communication has been launched, the information transmitted, the data, the signalling, the acknowledgements, etc. are transmitted, for example, multiplexed on all the pathways, so as to benefit from the diversity gain, but also to occupy the frequencies in both directions of communication, so as to prevent the frequencies from being detected as "free" by other communications which would disturb the communication in progress.

In the case where the method does not find any sub-band making it possible to attain the desired SLA, it adopts the sub-band offering the best score. It is noted that certain channels Ci may belong to several sub-bands Bj, and therefore may be tested several times. The method implemented by the called post then updates the scores of the various channels by the most recent tested value and will recalculate the set of scores of the sub-bands, to determine the best.

In case there were to be a significant number of non-accessible frequencies on the sub-band and the broadband response procedure on the entire sub-band $B_1$ were not effective, it is possible to proceed by transmitting the information message regarding the qualities not on the whole of the sub-band $B_1$, but multiplexed on the set of frequencies whose quality level is higher than a given threshold estimated by its signal-to-noise ratio in reception. The master post therefore receives a set of scores in respect of the channels of a tested sub-band and derives therefrom an overall score for the sub-band. This score corresponds not to a sum of the elementary quality scores in respect of the channels but to a weighted average taking account of the bitrates to which these scores correspond. Thus, for a sub-band B whose three frequencies would have been scored respectively 1, 4 and 11, the overall score will be 10275. This score has to be compared with the bitrate aimed at, for example a bitrate of 32 kb/s requires a score of at least 32000.

Figure 7:
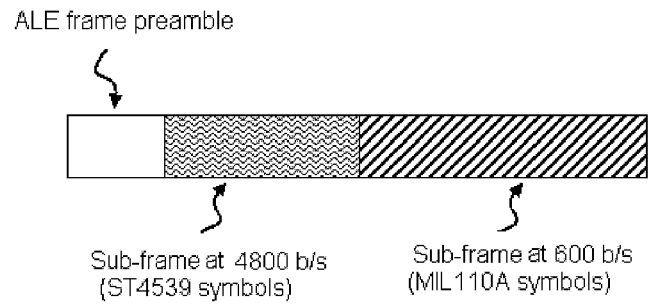

FIG. 7 shows diagrammatically an exemplary possible frame format for the test frame. Seen in this test frame are symbols originating from two different standards, each being demodulated by a particular equalizer. This is explained since preferably, to have a fine estimation of the quality of the channel, it is the same equalizer as that of the waveform employed for the subsequent phase of data transmission which will be used.

The test sequence can comprise an ALE frame preamble conveying the address of the called station, for example a multicast or group address, followed by a first series of medium-bitrate symbols, typically of STANAG 4539 symbols at 4800 b/s, and then of a second series of low-bitrate symbols, typically MIL STD 188-110A symbols at 600 b/s. This type of frame makes it possible notably to determine equalization errors for the various types of equalizer of the post or station.

For the two parts of the frame, the calculation for estimating the signal-to-noise ratio on the basis of the mean square error is performed on the constellation after equalization.

A numerical example will now be given to illustrate the principle implemented by the invention.

A frequency plan with 16 channels is considered, which are split into 4 sub-bands whose width does not exceed 200 kHz.

B1=union of channels C1 to C8
B2=union of channels C3 to C12
B3=union of channels C6 to C14
B4=union of channels C7 to C16

After the exchange phase, the following quality scores are obtained after testing the four sub-bands:

|  | C1 | C2 | C3 | C4 | C5 | C6 | C7 | C8 | C9 | C10 | C11 | C12 | C13 | C14 | C15 | C16 |
|---|---|---|---|---|---|---|---|---|---|---|---|---|---|---|---|---|
| Measurement B1 | 5 | 6 | 10 | 0 | 2 | 3 | 7 | 9 | | | | | | | | |
| Measurement B2 | 5 | 6 | 9 | 0 | 3 | 3 | 6 | 7 | 9 | 8 | 9 | 1 | | | | |
| Measurement B3 | 5 | 6 | 9 | 0 | 3 | 2 | 8 | 9 | 9 | 10 | 6 | 2 | 9 | 0 | | |
| Measurement B4 | 5 | 6 | 9 | 0 | 3 | 2 | 7 | 10 | 10 | 9 | 7 | 3 | 10 | 0 | 1 | 0 |
| Update | 5 | 6 | 9 | 0 | 3 | 2 | 7 | 10 | 10 | 9 | 7 | 3 | 10 | 0 | 1 | 0 |

The scores of the four sub-bands are then calculated:
B1: 20850
B2: 35950
B3: 37250
B4: 37175

In the example where a solution exceeding the score 34000 were sought, we would stop after having evaluated sub-band B3. On the other hand, in the case where the limit were placed at 40000, the four bands would be tested and ultimately the best would be adopted, that is to say here also B3.

It is therefore sub-band B3 which will be chosen, and in practice the master post will decide not to use C14 (totally jammed) and probably not C6 and C12 (very low bitrates whereas the other channels are passing and therefore could even potentially go beyond the detected bitrate if they are provided with more power).

The master post will therefore transmit a confirmation to the called post to indicate that sub-band B3 is adopted and to specify the channels which will be used for the commencement of the transmission phase, these channels being for example numbered in order of quality:

| Message 1 - example of the format of an ALM message. | | | | | | | | |
|---|---|---|---|---|---|---|---|---|
| C6 | C7 | C8 | C9 | C10 | C11 | C12 | C13 | C14 |
| 0 | 5 | 1 | 2 | 4 | 6 | 0 | 3 | 0 |

In practice it is this same message format which will be used when wishing to indicate, in the course of the ALM (automatic link management) procedure, a change of the frequencies employed.

It is noted that with this approach the sub-bands with more passing channels are implicitly favoured since the increase in the number of channels does not decrease the power transmitted in each channel during the test. However a sub-band with fewer frequencies, all of very good quality, will obtain a better score than a sub-band with many jammed frequencies, this being logical since it will make it possible to handle more data.

Having chosen the sub-band, the optimal number of channels in the sub-band is calculated by calculating the combination giving a priori the best bitrate having regard to the peak power constraint. Typically it is possible to use the technical teaching described in the Applicant's patent FR 11.03084 "Procédé et système permettant l'allocation dynamique de puissance et/ou modulation dans un système comprenant n canaux" [Method and system allowing dynamic power allocation and/or modulation in a system comprising n channels].

If appropriate, single-channel transmission might be the best choice, and will be considered if it makes it possible to serve the need of the service in progress. In practice it will be noted that bitrates lower than the compatible ST4539 minimum bitrate, typically 3200 b/s or indeed the low-bitrate 1600 b/s version, will be selected only if passing to low-bitrate 3 kHz single-band. Indeed, in the case where it is desired to transmit on several sub-carriers of "XL" type, the 4539XL waveform will be used, which does not implement bitrates of lower than 1600 b/s on a 3 kHz sub-band.

Figure 8:
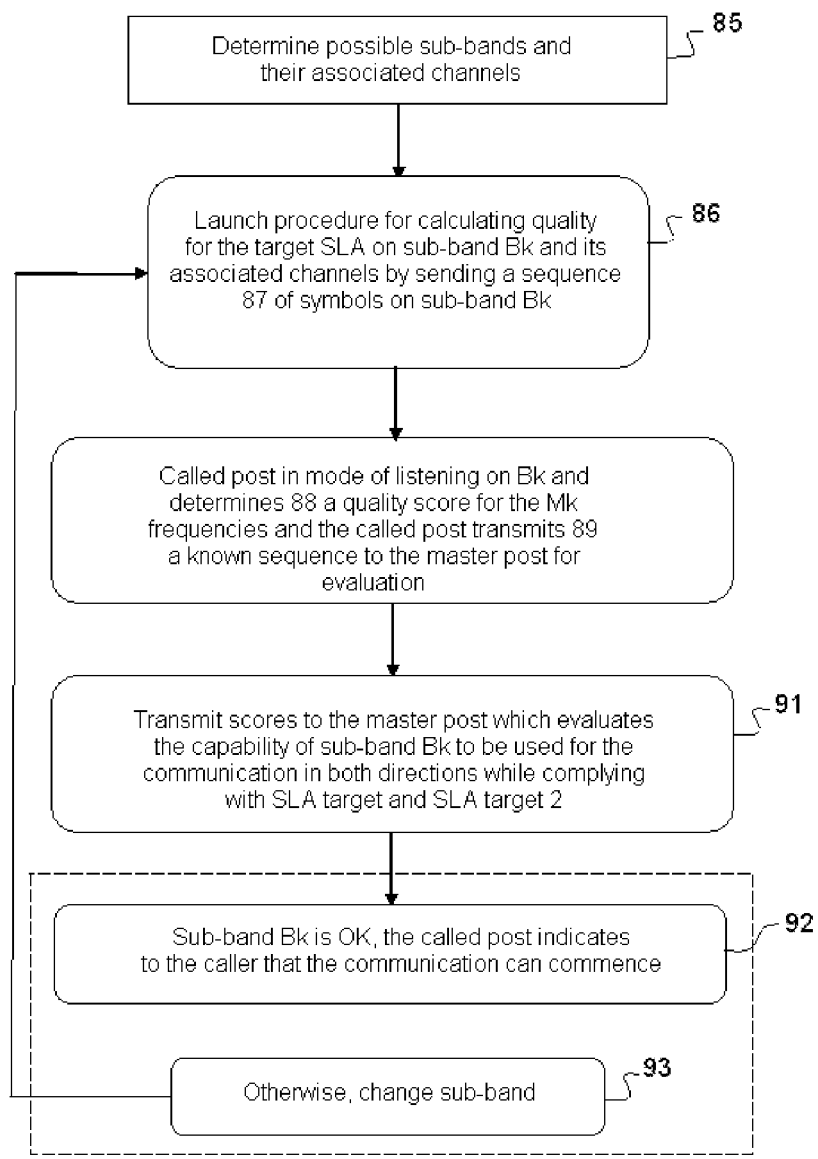

FIG. 8 shows diagrammatically by means of blocks the steps implemented by the method in the case of its application to a bidirectional communication.

Figure 6:
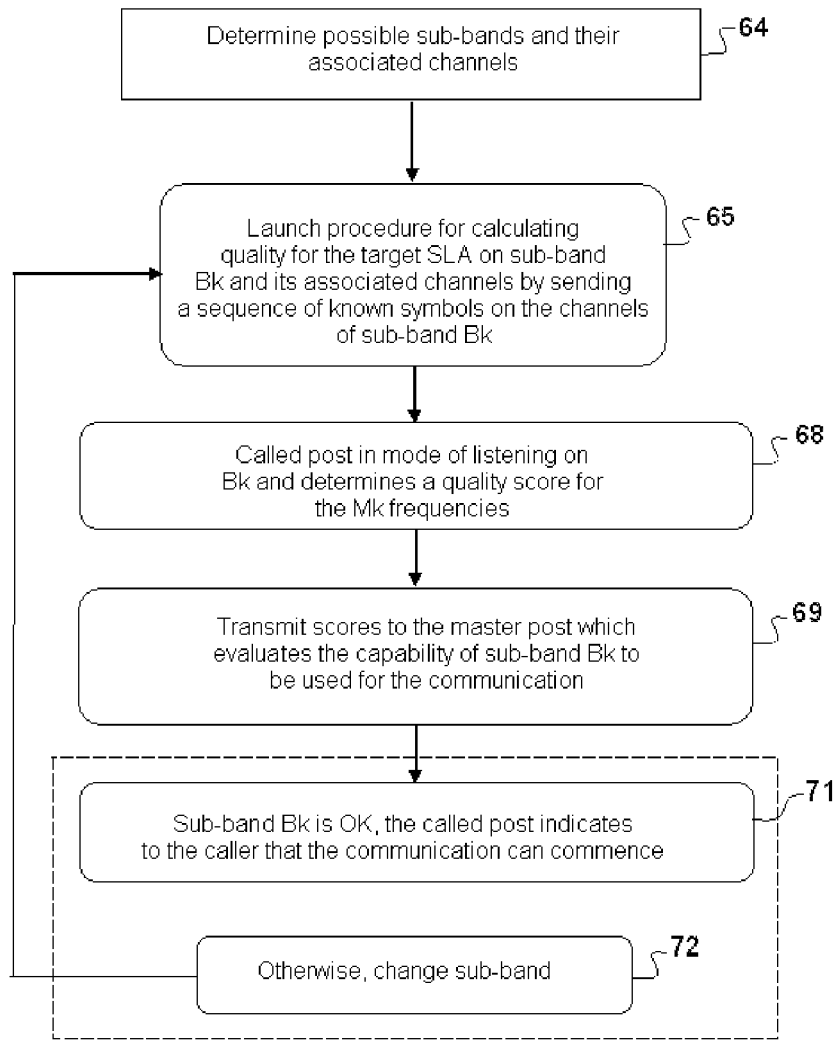

With respect to the case described within the framework of a unidirectional communication in FIG. 6, the exchanges are doubled so as to allow the master post to evaluate the various channels Ci of each tested sub-band. At the level of the quality decision, the objective is to allow the transmission of both bitrates, and therefore to have both levels of service or SLAtarget and SLAtarget2 satisfied. In the case where a choice ought to be made between various sub-bands not making it possible to attain the desired qualities, the evaluation will have to be done on the basis of an average of the bitrates attained over each of the two directions.

Initially, the master post will define a set of possible sub-bands for the communication.

In this configuration, the called post has here again by transmitting its characteristics but also information regarding its SLA target2, 84b when it responded in step 2 after having detected the call of the master post.

On the basis of this information, the master post determines 85 possible sub-bands and their associated channels. It can also perform an ordering in terms of possible bitrate for the operating point corresponding to the latency requirement and target error rate requirement. Let Bi be the various ordered sub-bands, with i varying from 1 to p. The master post orders the sub-bands by taking account of the directions of communication, master post to called post, or reciprocally, in terms of possible bitrate at the operating point, latency and target error rates.

The master post triggers the procedure 86 making it possible to determine the first traffic sub-band to be tested, the sub-band $B_1$ and its channels $f_1^1 \ldots f_{M1}^1$ and indicates it on the narrowband communication frequency fj of step 2. The called post acknowledges receipt of confirmation of the communication on the frequency fj. It passes to listening mode, for example on 200 kHz on sub-band $B_1$. The called post returns an agreement message to the master post for a test on $B_1$.

The master post transmits, 87, a first sequence of known symbols on sub-band $B_1$ to the called post. The called post, listening in on this sub-band $B_1$, will demodulate the $M_1$ frequencies of the sub-band. Next, the called post will compare the symbols received with the known sequence and will estimate, 88, the qualities on the $M_1$ frequencies of the sub-band and allocate quality scores Qi for the $M_1$ frequencies. The called post dispatches the corresponding quality information to the master post. The transmission of this information is performed, for example, in interleaved low-bitrate mode on the $M_1$ frequencies or on part of these frequencies, the best ones measured in the sense of the called post.

The called post transmits in its turn a second sequence of known symbols on sub-band B1, so as to evaluate the quality of the link in the called post-master post direction, 89.

The master post, on receipt of the quality scores will evaluate, 90, the capability of sub-band $B_1$ to respond to the needs of the services in both directions for the SLA target and the SLA target 2.

If the sub-band B1 fulfils the conditions required in respect of the service then the master station advises, 91, the called post, by using the selected sub-band $B_1$ and the communication between the two posts can begin on the n channels selected at the level of the selected sub-band.

In the converse case, when sub-band $B_1$ does not offer the capability required in respect of the communication, the method followed announces to the calling station that it is considering the next band $B_{i+1}$ and for the associated channels. The master post acknowledges receipt and proceeds to listen in on the new sub-band. The called post acknowledges receipt to the master post and performs measurements of quality for this sub-band as has been described previously.

In the case of non-response on a sub-band, the method switches automatically, on the transmitter side and on the receiver side, to a sub-band $B_{i+1}$ of the frequency plan.

In the case of an alternating bidirectional mode on channels different in transmission and in reception the bidirectional timechart remains valid but the master post determines a non-averaged selection of frequencies for the two directions of transmission and may also succeed in employing channels in number which differ over the two directions of transmission. This application makes it possible notably to guard against local jamming.

Sustaining the Link ALM

A sub-band $B_i$ having been chosen, the ALE procedure according to the invention is terminated and the sub-band remains unchanged as long as the ALE procedure is not relaunched.

Figure 9:
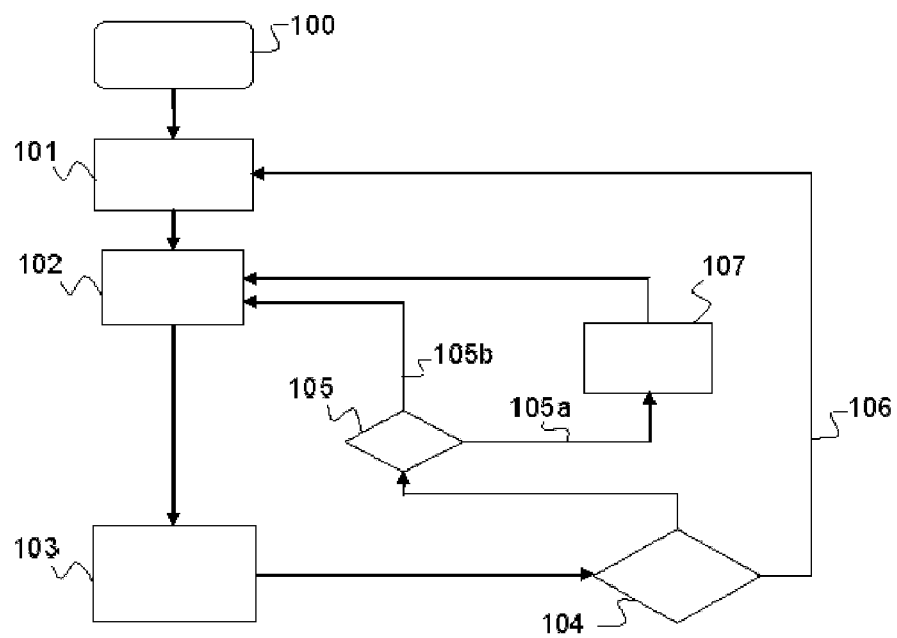

FIG. 9 shows diagrammatically an exemplary incorporation of the ALE procedure according to the invention in an ALM diagram.

The modulations and therefore the bitrates used on each channel may or may not vary over time, and likewise the choices of the channels used inside the sub-band will be changed dynamically by virtue of ALM messages.

It is the master post which manages the optimization of the use of the band, in view of the scores uploaded in the course of communication by the remote station and optionally of its own analysis of the sub-band when it is receiving.

100—service request

101—ALE negotiation by executing for example steps E1, E2 and E3,

102—transmission of data, with every X frames, relaunch of the bitrate management procedure, for example as taught in the Applicant's proposal for a patent of invention FR 11.03084 "Procédé et système permettant l'allocation dynamique de puissance et/ou modulation dans un système comprenant n canaux" [Method and system allowing dynamic power allocation and/or modulation in a system comprising n channels],

103—the next step is a step of optimization calculation with the choice of the channels and their number, the modulation and coding schemes,

104—is the proposal of the optimization step compatible with the service sought, then

105—does the proposal of the optimization step involve a change of the channels,

105*a*—if so, the master post forewarns the called post of the change by an ALM message 107 before switching, with a lag to allow for this switch to be taken into account, to the transmission of the data in the new configuration of channels,

105 *b*—otherwise the proposal of the optimization step does not involve any change of channels, then the autobaud fields alone will be modified to indicate the new choice or choices of modulation based on channel and the change can therefore be applied forthwith,

106—in the case where the proposal of the optimization step is incompatible with the service sought, then the ALE method according to the invention is relaunched at the level of step E1 or at the level of step E3.

This mechanism exhibits two aspects:

1—it ensures the transmission of the messages regarding change of frequencies to be listened to, 2—it relaunches the ALE procedure when the channel deteriorates too much in view of the service sought.

4G ALM is therefore enriched in terms of capability to incorporate a preventive capability allowing on the one hand changes of frequency in the useful band but also making it possible to relaunch the procedure for choosing band before the communication is overly degraded via a protection mechanism related to the quality of the usable channels and to the service that they are able to offer in relation to the service in progress.

By adjusting this threshold of compatibility of the service sought with a margin, it is therefore possible to decide to relaunch the ALE procedure before losing the communication totally, as illustrated in FIG. 9, this possibly enabling a signalling message to be transmitted indicating that the ALE procedure is relaunched: it is proposed to dispatch a message conveying the information of the sub-band that will be tested for ALE and its target frequencies, multiplexed on the whole set of channels which are active at the moment of transmission and are used at low-bitrate, as in the standard ALE procedure illustrated in FIG. 6. This will make it possible to accelerate the procedure by avoiding having to again pass through the initial phase of searching for a first passing narrowband frequency.

In respect of the ALM messages regarding updating of the selected channels, it is possible to use the same format as that proposed in respect of the ALE procedure result message, namely a binary vector of the various channels present in the frequency plan for the sub-band considered. If the frequency is selected, the bit is set to 1, otherwise it is set to 0.

| ALM Info | ALM Info | C0 | C1 | C2 | C3 | ... | $C_{M-1}$ | $C_M$ |
|---|---|---|---|---|---|---|---|---|
| | | 0 | 1 | 0 | 0 | ... | 0 | 1 |

Another possibility is to number in this message the channels in an ascending manner, increasing as a function of their use in the sub-band of interest, at the cost of a signalling that is more expensive in terms of bitrate.

In order to improve the procedure for evaluating the link, it is proposed to also include in the ALM a slow mechanism for probing the channels that are not used in communication. This mechanism employs the principle used in the ALE procedure which transmits pseudo-random data in various formats (600 b/s, 4800 b/s) so as to evaluate the performance on the various channels probed with the target equalizer of the waveform which could be used. In order to only minimally disturb the communication in progress, the probing data will not be multiplexed with the useful data transmitted, but will be transmitted in parallel on the narrowband channel tested by means of a specific carrier conveying a frame similar to that described in FIG. 7 so as not to degrade the communication. In this case the broadband transmission will comprise the data carriers and also the probing carrier in one and the same transmission. The information regarding quality obtained by this probing will be used to refine the estimation of quality measured in reception by simple integration of the noise. In order for this probing not to compel systematic transmission of an ALM message indicating the additional channel to be listened to, it is proposed to adapt a simple mechanism as follows: it is the ALE or ALM message which indicates the launching of the probing mechanism, for example by using two 'ALM Info' bits positioned at the head of the message 2 bits ($b_1 \ldots b_2$): complementary probing mechanism
        0: no probing in progress (or stoppage of the probing in progress)
        1: launching of the probing from the first frequency of the plan
        2: launching of the probing from the n/3 th frequency of the plan
        3: launching of the probing from the 2n/3 th frequency of the plan
    n bits ($b_3 \ldots b_{n+2}$): information regarding use in communication of each of the n channels of the plan in the sub-band considered (max: n channels therefore). By default n=30.
    For each bit: 0: channel not used/1: channel used This mechanism could for example be launched by carrying out a transmission on two consecutive frames, before changing to the next frequency not used in the plan and so on and so forth.

The values nb frames, speed of change etc. will have to be validated by tests.

Advantages

The method and the system according to the invention offer the possibility of a broadband link setup and link sustaining, grading the channels used, but also makes it possible to accelerate link setup for asynchronous posts and to be compatible with existing posts.

The invention offers notably the following advantages:
- it is an HF broadband link setup solution which remains compatible with existing standards, subject to a choice regarding the existing standard in question,
- it allows an improvement in the speed of link setup between all the posts in which this mechanism is embedded or those communicating with asynchronous "legacy" posts or synchronous "legacy" posts accepting the updating of the frequency plans by radio,
- it allows effective interaction of the ALM with the ALE by relaunching the ALE directly in phase 3,
- it is applicable without it being necessary to modify the existing ALE standard, and therefore without breaking the interoperability with equipment not modified according to the method,
- by starting the communication as soon as a suite of resources that are compatible with the need is found, it avoids having to test very many configurations to select the best, this not being useful when a worse configuration nonetheless makes it possible to provide the desired service.

The invention claimed is:

1. A system for establishing and sustaining a link ALE (automatic link establishment) within a framework of a bidirectional broadband communication, the said system comprising at least:
   a first master communication post configured to transmit a message for the establishment of a bidirectional communication with a first desired Service Level Agreement (SLA) target service with a first bitrate and a second desired SLA target service, different from the first desired SLA target service, with a second bitrate, the first master communication post comprising a first radio transmitter/receiver and a first controller; and
   a second called communication post comprising a second radio transmitter/receiver and a second controller, wherein
   the first master communication post is configured to define a set of sub-bands, to transmit a known test sequence, Stest, on a sub-band Bk to the second called communication post as soon as the second called communication post acknowledges switching to probing mode to determine the best configuration to be adopted for the establishment of the link meeting predetermined conditions of the first desired SLA target service and the second desired SLA target service,
   the second controller configured to determine quality scores based on a maximum bitrate on Mk frequencies of the sub-band Bk and based on a comparison of received symbols with the known test sequence, to transmit the quality scores to the first master communication post, and to transmit regarding the second desired SLA target service, and
   the first master communication post configured to determine a capability of the sub-band Bk to respond to the first desired SLA target service and to the second desired SLA target service, to determine a sub-channel based on the quality scores received, and to select the sub-band Bk representing the predetermined conditions of the first desired SLA target service and the second desired SLA target service, and thereafter to trigger the bidirectional communication with the second called communication post.

2. The system according to claim 1, wherein the first master communication post comprises a processor for determining a set of call frequencies $f_A$ for the establishment of a narrowband link between the first master communication post and the second called communication post based on requested bitrate, permitted maximum latency, operating point of a target error rate, the call frequencies being used during the communication request.

3. The system according to claim 1, wherein the first master communication post comprises a transmitter for establishing a narrowband communication linkup between the first master communication post and the second called communication post, for verifying a compatibility of the second called communication post with a 4G mode of communication and for continuing the communication in a mode compatible with the second called communication post.

4. The system according to claim 1, wherein a known test sequence $S_{test}$ is composed of a frame comprising a header conveying an address of the second called communication post, a first series of medium-bitrate symbols and a second series of low-bitrate symbols.

5. The system according to claim 1, wherein the communication system is a High-Frequency broadband system and in that the first master communication post and the second called communication post are HF posts.

6. A method of broadband ALE link setup and link sustaining between a first master communication post and a second called communication post, executed within a system according to claim 1, comprising at least the following steps:
the second called communication post is on standby monitoring a predefined frequency plan $\{f_1, \ldots f_M\}$;
the first master communication post transmits a communication request message to the called post on a frequency fi and waits for its acknowledgement of call detection;
the first master communication post has a set of possible sub-bands for the communication;
the first master communication post starts a quality score calculation procedure by transmitting a known test sequence to the said second called communication post, the said called communication post determines the quality scores on the Mk frequencies of the sub-band Bk, and then transmits these values to the master communication post;
the first master communication post determines based on the quality scores, the capability of the sub-band Bk to respond to the first desired SLA target service and the second desired SLA target service; and:
selects the sub-band if the first master communication post makes it possible to respond to an SLA service requested by the communication, or
selects a new sub-band Bk, or else
when there no longer remain any sub-bands making it possible to attain a quality higher than the best quality found on previously tested sub-bands, elects the sub-band exhibiting the best quality score, and determines the sub-band to be used for the communication, confirms to the called communication post the selected sub-band as well as sub-channels adopted and starts the communication.

7. The method according to claim 6, wherein the quality score of a channel is evaluated by a post receiving a test sequence by estimating the bitrate that the post will be able to receive on the channel considered.

8. The method according to claim 6, wherein when no sub-bands satisfying the predetermined conditions of the desired SLA are found, the method selects the band exhibiting the best quality score and updates the quality scores of the various channels by the most recent tested value.

9. The method according to claim 6, wherein when no sub-bands satisfying the predetermined conditions of the desired SLA are found, the first master communication post selects the band exhibiting the best quality score and updates the quality scores of the various channels by the most recent tested value.

10. The method according to claim 6, further comprising a step of narrowband link initialization verifying a compatibility of a mode of communication between the first master communication post and the second called communication post and continues the communication with the compatible mode found or terminates the communication request.

11. The method according to claim 6, further comprising a step of link initialization using a broadband called post suitable for monitoring several frequencies at the same time.

12. The method according to claim 6, further comprising using as test sequence a message in a form of a frame composed of a first header containing an address of the second called communication post, followed by a first series of medium-bitrate symbols and a second series of low-bitrate symbols.

13. The method according to claim 12, wherein the symbols used are chosen from among the following list: PSK (Phase Shift Keying), QAM (Quadrature Amplitude Modulation).

14. The method according to claim 6, wherein the communication between the first master communication post and the second called communication post being established, then the information transmitted is multiplexed on all pathways.

15. The method according to claim 6, wherein an HF broadband communication band is used.

16. A system for establishing and sustaining a link ALE (automatic link establishment) within a framework of a bi-directional broadband communication, the system comprising at least:
a first master communication post configured to transmit a message for the establishment of a communication with a first desired Service Level Agreement (SLA) target service and a second desired SLA target service, the first post comprising a first radio transmitter/receiver and a first controller, and
a second called communication post comprising a second radio transmitter/receiver and a second controller, wherein
the first master communication post is configured to define a set of possible sub-bands for the bi-directional communication, to determine possible sub-bands and their associated channels, to execute a procedure to determine a first traffic sub-band to be tested, a sub-band $B_1$ and its channels $f_1^1 \ldots f_{M1}^1$; to communicate on a frequency $f_j$ the first sub-band to be tested and its channels, to transmit to the second called communication post a first sequence of known symbols on the sub band $B_1$, and to determine whether the sub-band $B_1$ meets requirements of the first desired SLA target service and of the second desired SLA target service in both communication directions, and
the second called communication post is configured to acknowledge receipt of confirmation of the communication on the frequency $f_j$, to pass into a listening mode, to transmit an agreement message to the first master communication post or a test on the sub-band $B_1$, to demodulate the channels of the sub-band $B_1$, to compare the known symbols with a known sequence, to determine a quality score for each of the channels of the sub-band $B_1$, to transmit the quality score for each of the channels of the sub-band $B_1$ to the first master communication post, and to transmit a second sequence of known symbols on the sub-band $B_1$ to the first master communication post.

17. The system of claim 16, wherein:
the first master communication post is further configured to notify the second called communication post if the sub-band $B_1$ meets the requirements of the first desired SLA target service and of the second desired SLA target service,
the first master communication post is further configured to notify the second called communication post that the first master communication post is considering a next sub-band $B_{i+1}$ and for associated channels when the sub-band $B_1$ does not meet the requirements of the first desired SLA target service and of the second desired SLA target service, and the second called communication post is further configured to acknowledge a notification from the first master communication post that the sub-band $B_1$ does not meet the requirements of the first desired SLA target service and of the second desired SLA target service, to listen to the next sub-band $B_{i+1}$, and to determine a quality score of the next sub-band $B_{i+1}$.

18. The system of claim 16, wherein the first master communication post is further configured to switch automatically to a sub-band $B_{i+1}$ when the sub-band $B_1$ is not responsive.

* * * * *